O. EDELMANN.
BRACKET FOR SUSPENDING CABLES AND THE LIKE.
APPLICATION FILED NOV. 2, 1920.

1,384,437.

Patented July 12, 1921.

Inventor:
Otto Edelmann,
by Joel A. Palmer
Atty.

UNITED STATES PATENT OFFICE.

OTTO EDELMANN, OF OAK PARK, ILLINOIS, ASSIGNOR TO WESTERN ELECTRIC COMPANY, INCORPORATED, OF NEW YORK, N. Y., A CORPORATION OF NEW YORK.

BRACKET FOR SUSPENDING CABLES AND THE LIKE.

1,384,437. Specification of Letters Patent. Patented July 12, 1921.

Application filed November 2, 1920. Serial No. 421,253.

*To all whom it may concern:*

Be it known that I, OTTO EDELMANN, a citizen of the United States, residing at Oak Park, in the county of Cook and State of Illinois, have invented certain new and useful Improvements in Brackets for Suspending Cables and the like, of which the following is a full, clear, concise, and exact description.

This invention relates to improvements in brackets for suspending cables and the like from overhead beams or the like or for supporting cables or the like on beams.

The object of the invention is to provide a bracket which is simple in construction and which can be attached to beams of various widths having flanges of different thicknesses.

Another object is to provide cable holding members that may be adjusted to hold any number of cables and a simple means for binding the cable holding members in position.

A further object is that cable holding members of various shapes and sizes may be used.

Figure 1:
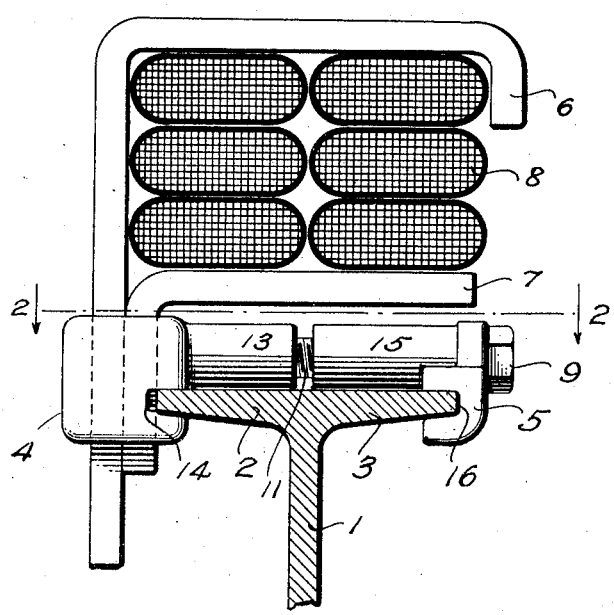
Figure 2:
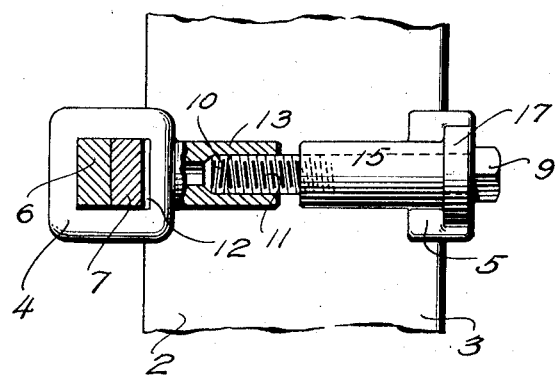

A still further object is to provide a bracket which will maintain cables or the like in a number of positions with respect to its support. It will be seen that this bracket will support the cable on top of and at either side and above, below and at either side and below the supporting beam. If the supporting beam happens to be in a vertical position, the cable may be supported in six different positions with respect to it. This and other features of the invention will be more clearly understood from the following specifications and the accompanying drawings in which Figure 1 represents a bracket attached to an I beam and adjusted to hold a certain number of cables. Fig. 2 is a top view with parts broken away.

Similar characters of reference designate corresponding parts in the figures. 1, designates the beam to which said bracket is attached. 2 and 3 are the flanges of the beam 1. The member 4 is a jaw which has an opening 12 through it to receive the cable holding members 6 and 7. It also has a groove 14 for engagement with the flanges 2 of the support and a projection 13 having an internal thread 10 therein to engage with the connecting member. The other jaw 5 has a groove 16 to engage with the support and a projection 15 extending parallel to the place of the groove. An opening 17 having an internal thread therein extends through the jaw. A connecting screw 9 having an external thread 11 extends through jaw member 5 and engages with internal thread 10 of the jaw member 4 to draw the jaw members together and clamp them on to the support, at the same time drawing cable holding member 7 against the flanges of the beam and binding the cable holding members in any desired position.

From the above description it will appear that a new and useful cable bracket has been designed and what I wish to claim as new and cover by Letters Patent is:—

1. A cable bracket comprising a pair of jaw members having grooves for engagement with the support, one of said jaw members having an opening through it, a pair of cable holding members extending through said opening in said jaw member, means for connecting said jaw members together and binding said cable holding members in position.

2. A cable bracket comprising a pair of jaw members having grooves for engagement with the support, one of said jaw members having an opening through it at right angles to the plane of the groove and intersecting said groove, a pair of L shaped cable holding members extending through said opening in said jaw member and means to draw said jaw members together and to bind said cable holding members in any desired position.

3. A cable bracket comprising a pair of jaw members having grooves for engagement with the support, one of said jaw members having an opening through it at right angles to the plane of the groove and a projection having an internal thread therein extending parallel to the plane of the groove, a pair of L shaped cable holding members extending through said opening in said jaw member, a second jaw member having a projection parallel to the plane of the groove and a hole therethrough, a connecting screw coöperating with said internal thread to draw the jaw members together and bind said cable holding members in any desired position.

In witness whereof, I hereunto subscribe my name this 27th day of October, A. D. 1920.

OTTO EDELMANN.